United States Patent [19]

Tsuchihashi

[11] Patent Number: 5,715,388
[45] Date of Patent: Feb. 3, 1998

[54] COMPUTER SYSTEM FOR CONTROLLING AN INDUSTRIAL ROBOT SUBSYSTEM WHICH CAN MONITOR AND DETECT ABNORMALITIES THEREIN

[75] Inventor: Akira Tsuchihashi, Tokyo, Japan

[73] Assignee: Kohki Co., Ltd., Tokyo, Japan

[21] Appl. No.: 829,480

[22] PCT Filed: Sep. 22, 1993

[86] PCT No.: PCT/JP93/01356

§ 371 Date: Mar. 22, 1995

§ 102(e) Date: Mar. 22, 1995

[87] PCT Pub. No.: WO95/05241

PCT Pub. Date: Feb. 23, 1995

Related U.S. Application Data

[63] Continuation of Ser. No. 381,961, Mar. 22, 1995, abandoned.

[30] Foreign Application Priority Data

Sep. 25, 1992 [JP] Japan .................................. 4-256115

[51] Int. Cl.[6] ........................................................ G06F 11/00
[52] U.S. Cl. .............................. 395/183.22; 395/189.01; 395/185.1; 395/80
[58] Field of Search ................ 395/183.21, 183.22, 395/182.13, 182.14, 185.1, 185.01, 80, 189.01

[56] References Cited

U.S. PATENT DOCUMENTS

| | | | |
|---|---|---|---|
| 3,904,860 | 9/1975 | Huber et al. | 395/183.21 |
| 4,293,925 | 10/1981 | Haag et al. | 395/183.21 |
| 4,617,502 | 10/1986 | Sakaue et al. | 318/568 |
| 4,628,511 | 12/1986 | Stitzlein et al. | 395/183.21 |
| 4,755,997 | 7/1988 | Takahasi | 395/183.22 |
| 4,763,055 | 8/1988 | Daggett et al. | 318/368 |
| 4,949,252 | 8/1990 | Hauge | 395/183.21 |
| 4,953,391 | 9/1990 | Mizushima et al. | 395/183.21 |
| 5,047,977 | 9/1991 | Hill et al. | 395/185.1 |
| 5,165,036 | 11/1992 | Miyata et al. | 395/183.21 |
| 5,210,859 | 5/1993 | Aoshima et al. | 395/183.22 |
| 5,283,891 | 2/1994 | Suzuki et al. | 395/183.21 |
| 5,297,263 | 3/1994 | Ohtsuka et al. | 395/185.01 |
| 5,321,698 | 6/1994 | Nguyen et al. | 395/182.15 |
| 5,339,406 | 8/1994 | Carney et al. | 395/183.21 |
| 5,353,386 | 10/1994 | Kasagami et al. | 395/82 |
| 5,375,125 | 12/1994 | Oshima et al. | 395/183.22 |
| 5,390,323 | 2/1995 | Newell et al. | 395/183.21 |
| 5,432,715 | 7/1995 | Shigematsu et al. | 395/185.1 |

FOREIGN PATENT DOCUMENTS

| | | | |
|---|---|---|---|
| 27 17 375 | 4/1977 | Germany. | |
| 62-44849 | 2/1987 | Japan | G06F 11/34 |
| 2-228742 | 9/1990 | Japan | G06F 11/34 |
| 2-270043 | 11/1990 | Japan | G06F 11/34 |
| 3-144705 | 6/1991 | Japan | G05B 19/05 |
| 4-24840 | 1/1992 | Japan | G06F 11/32 |
| 4-238548 | 8/1992 | Japan | G06F 11/28 |
| 60-86633 | 5/1995 | Japan | G06F 11/34 |

OTHER PUBLICATIONS

IBM Technical Disclosure Bulletin, vol. 30, No. 6, Nov. 1987 "Performance Trace Facility".

"The Control System of the Autonomous Mobile Robot Kamro of the University of Karlsruhe", Rembold et al., An International Conference, The Netherlands, Dec. 11–14, 1989, pp. 565–575.

IBM PC AT Technical Handbook, pp. 211–213.
Electronic Technical Publication, Sep. 1988, p. 36.

*Primary Examiner*—Robert W. Beausoliel, Jr.
*Assistant Examiner*—Joseph E. Palys
*Attorney, Agent, or Firm*—Nixon & Vanderhye P.C.

[57] ABSTRACT

Each of the states of the computer system is displayed in units of a module which is executed for a predetermined time period, thereby facilitating diagnosis and countermeasure by a maker. For this purpose, software of a computer system operable by software is classified hierarchically, a module of the hierarchical software which is being executed for a predetermined time period is managed as a minimum unit and displayed on an as-needed basis, and the state of execution of the software can be understood.

3 Claims, 3 Drawing Sheets

COMPUTER SYSTEM FOR CONTROLLING AN INDUSTRIAL ROBOT SUBSYSTEM WHICH CAN MONITOR AND DETECT ABNORMALITIES THEREIN

This is a continuation of application Ser. No. 08/381,961, filed Mar. 22, 1995, now abandoned.

TECHNICAL FIELD

The present invention relates to a computer system and more particularly to a computer system capable of displaying and storing a module under execution or immediately after execution.

BACKGROUND ART

In general, an industrial robot comprises a control board for storing and reproducing position information and conditions for machining, a teaching box (T-BOX) for instructing the control board the direction of movement, the position of movement and the condition for machining, and a working robot operating according to instructions from the T-BOX or according to instructions from the control board by reproducing the contents instructed by T-BOX.

The T-BOX includes a step number display section, instruction items selection switches, a manual switch section, instruction push button switches, a memory command switch, a plurality of display lamps, etc.

The step number display section displays the step number attached to each of teaching steps.

The instruction item selection switch is operated to designate the teaching content. The instruction item selection switches are provided with selection items associated to functions of the working robot, e.g. designation of position, designation of movement condition for designating the kind of a locus of movement, e.g. linear movement or circular movement, designation of machining conditions, etc.

The manual switch section is operated to drive each axis of the working robot independently at the time of teaching. In the case of a robot having a rectangular coordinate system, the manual switch section is provided with movement command switches for inputting movement commands for driving X-, Y- and z-axes and θ- and ψ-axes of a wrist. In the case of a joint-type robot, the manual switch section is provided with movement command switchs for inputting movement commands for driving a rotational axis, a lower arm, an upper arm and θ- and ψ-axes of a wrist.

The instruction push button switch and memory command switch are operated to send information set by a teaching operation to the control board and to store the information therein.

The display lamp is provided for each of the selection items in the teaching mode.

The operation of the working robot is determined by a command from the T-BOX or a drive command read out by the control board and processed in a predetermined manner at the time of playback. A workpiece is aligned to the working robot by fixing means.

In the computer system having the above structure, the T-BOX is operated prior to machining, and a tip portion of a machining tool of the working robot is moved along a machining line of a workpiece while being visually monitored. Thus, the working robot is manually operated. With the manual operation of the working robot, a teaching operation is performed in which machining conditions for machining the workpiece and operational procedures and positions of the tip portion of the machining tool of the working robot are stored in internal memory means of the control board.

If the teaching operation of the working robot is completed, an automatic operation, i.e. a playback operation is capable of initiating on the basis of the machining conditions and operational procedures and positions of the tip portion of the machining tool which are stored in the internal memory means of the control board. Then, the control board reads out the already taught position information of the machining line and machining conditions and subjects them to predetermined processing. Thereafter, the resultant is supplied to the working robot as a driving signal, and the tip portion of the working tool of the working robot is operated in the playback manner along the previously taught locus.

In a conventional computer system for actuating the above working robot, each component is treated at an equal level. After the system is activated, a main component is executed in an interrupt manner. If an error occurs, a code number is displayed with an error code so that the cause of trouble corresponding to the code number can be diagnosed by referring to a table prepared in advance which shows causes of troubles.

Thus, there is a problem with the conventional computer system, in that the state of execution of a program cannot be understood while the computer system is working normally.

In addition, there is a problem with the conventional computer system, in that when abnormality occurs, only a predicted cause registered in an error code can be found.

Furthermore, there is a problem with the conventional computer system, in that an execution list can be printed out and checked only by an expert of system software with a great deal of time required.

DISCLOSURE OF THE INVENTION

The object of the present invention is to provide a computer system capable of displaying each of the states of the computer system in units of a module which is executed for a predetermined time period, thereby facilitating diagnosis and countermeasure by a maker.

In the computer system of the present invention, for example, if a CPU of a servo sub-system malfunctions, the man-machine sub-system monitors and displays the code number of an error code of the CPU of the servo sub-system by a display function. If power is not supplied to the peripheral element of the robot, the code number of an error code to that effect is displayed. By referring the operation manual the code number, the error content can be understood.

When an abnormality has occurred, there is a case where although it is understood that the abnormality occurs in the CPU, it is not understood what the CPU was doing and what results in the abnormality. If the module computed at the time of abnormality is identified, it is understood whether hardware or software was wrong. The user cannot understand what was processing just before the occurrence of abnormality. If the content of processing just before the occurrence of abnormality is understood to the user, the maker receives a report from the user and this is useful in tracing the location of abnormality and facilitating the repair.

In the present invention, in order to easily diagnose the cause of such abnormality, software of a computer system operable by software is classified hierarchically, a module of the hierarchical software which is being executed for a predetermined time period is managed as a minimum unit and displayed on an as-needed basis, and the state of execution of the software can be understood.

In this case, it is desirable that a module of the software just after executed be similarly displayed.

Furthermore, in the present invention, software of a computer system operated by software is classified hierarchically, and a module of the hierarchical software, which is being executed for a predetermined time period, is stored as a minimum unit by rewriting the executed module each time execution is effected. The stored content is frozen simultaneously with occurrence of abnormality, and it can be checked at an early stage which module being executed is malfunctioning.

In this case, it is desirable that a module of the software just after executed be similarly displayed.

It is further desirable that the display and storage be effected in an overlapping manner among sub-systems.

BEST MODE FOR CARRYING OUT THE INVENTION

Figure 1:
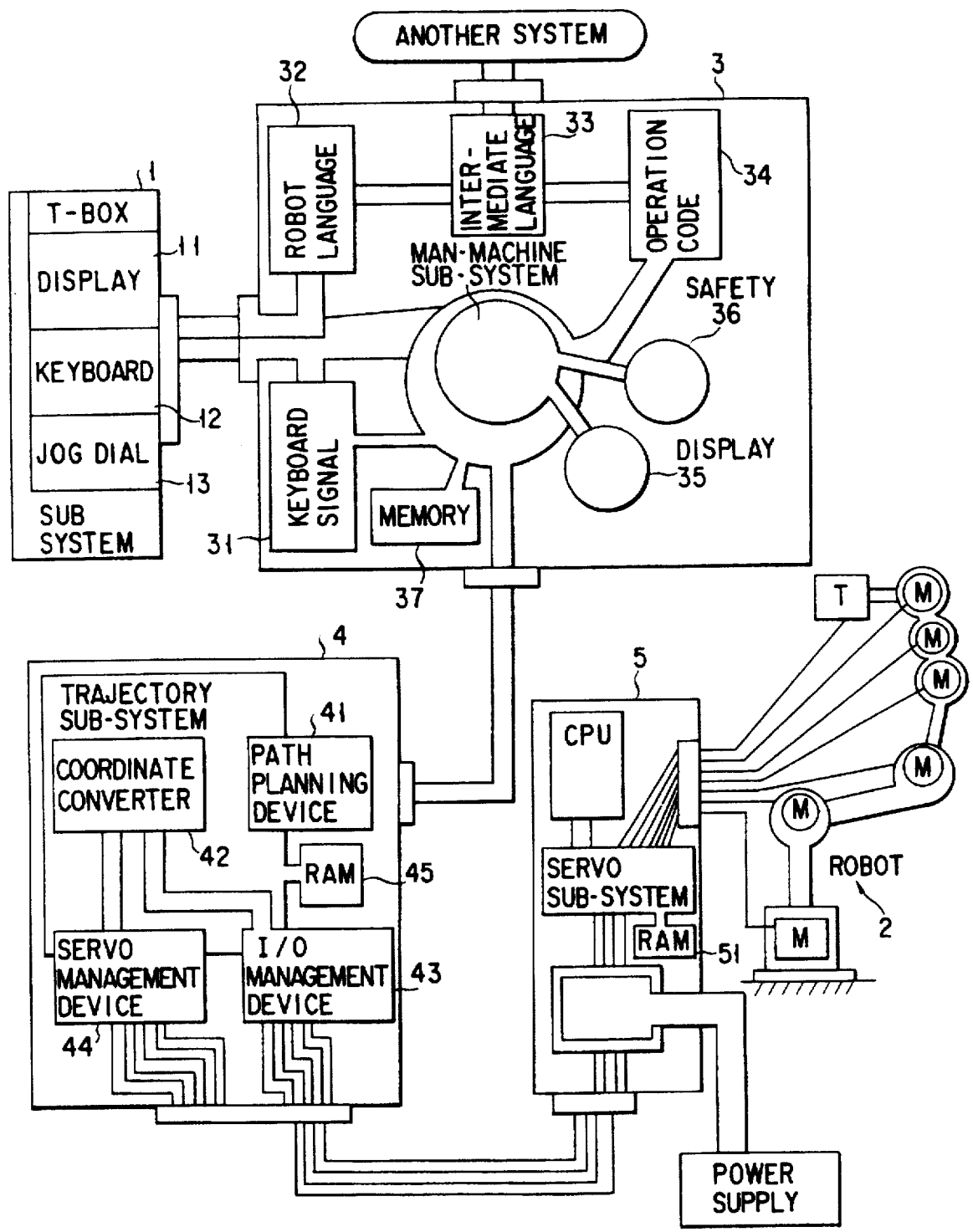
FIG. 1 shows a computer system structure of a computer system according to the present invention for executing software classified in a hierarchical manner.

In FIG. 1, a teaching box (T-BOX) has functions of issuing a command for activating a working robot 2 and assembling a sequence program while actually operating the working robot 2. The sequence program is assembled by storing specific points one by one while actually actuating the working robot 2.

The T-BOX 1 has a display 11, a keyboard 12 and a jog dial 13. The display 11 displays the content input by the keyboard 12 or displays an error message. The keyboard 12 specifies a moving object (e.g. a first joint, a third joint, etc.) of the working robot 2. The jog dial 13 determines how the object (e.g. third joint) specified by the keyboard 12 is moved, and to what degree. Specifically, when the dial is turned to the right, for example, this indicates actual rotation of the third joint in the X-axis direction. When the dial is turned to the left, this indicates actual rotation of the third joint in the Y-axis direction. This jog dial 13 is used only for setting of position.

When a tip portion of the working robot 2 has been moved to a predetermined working position, an instruction of "arc", for example, is given by the keyboard 12 if welding is ordered. If the tip portion of the working robot 2 is moved to a reference position or a path start position, a button P is depressed. That is, the robot is asked to start from the point P and move according to the program, and in case of spot welding, it is to perform spot welding. Such preparatory setting is performed in the teaching box (T-BOX) 1.

A man-machine sub-system 3 has functions of converting a working command of the working robot 2 from the T-BOX 1 to an execution code and sending it to a trajectory sub-system 4.

The man-machine sub-system 3 includes a keyboard signal converter 31, a robot language translator 32, an intermediate language translator 33, an operation code executor 34, a display indicating function 35, a safety function 36 and a memory 37.

The keyboard signal translator 31 reads in a signal input from the keyboard 12 as data and converts the signal to an actual system signal. Specifically, the keyboard signal converter 31 converts the input signal from the keyboard 12 to such a signal as to be executed by the man-machine sub-system 3 and provide an instruction to the trajectory sub-system 4.

The robot language translator 32 converts a signal input from the keyboard 12 to on intermediate language. The robot language is a language capable of designating the position, for example, like working instructions such as ARC ON, X=50, Y=38 and Z=169, and of teachings works to the robot without actually moving the robot.

The intermediate language translator 33 is constructed such that a system control signal can be input to the translator 33 from another system by using the intermediate language. However, when the working robot 2 is moved by the instruction from this other system, translation to an executable code is effected language by the intermediate language translator 33.

The operation code executor 34 instructs works directly to the trajectory subsystem 4.

The display indicating function 35 controls the display 11 of the T-BOX 1.

The safety function 36 makes the working robot 2 operate constantly to ensure safety. That is, the safety function 36 is a function of performing a fail-safe operation.

The memory 37 stores the operation of the working robot 2 instructed by the T-BOX 1.

The trajectory sub-system 4 calculates the operational path of the working robot 2 on the basis of the command signal sent from the man-machine sub-system 3.

This trajectory sub-system 4 includes a path planning device 41, a coordinate converter 42, an I/O management device 43 and a servo management device 44.

The path planning device 41 calculates, on the basis of the position information of the tip portion of the working robot 2 sent from the man-machine sub-system 3, how the arm of the working robot 2 should shift the tip portion of the working robot 2 to a predetermined position.

The coordinate converter 42 converts to an individual coordinate signal the position of each axis associated with the movement of each joint of the arm of the working robot 2 calculated by the path planning device 41.

The I/O management device 43 outputs the coordinate signal converted by the coordinate converter 42 to the servo sub-system 5. In addition, the I/O management device 43 issues a command relating to the turning-on/off of an external device such as a torch T which actually emits an arc.

The servo management device 44 designates the position of the tip portion of the working robot 2 and moves each joint (motor M) of the arm of the working robot 2 to the designated position.

The servo sub-system 5 performs arithmetic operations to determine the degree movement of the axis of each joint of the arm of the working robot 2, which is to be moved the rod tip portion of the working robot 2 to a predetermined coordinate position based on each coordinate signal sent from the trajectory sub-system 4. For this purpose, the servo sub-system 5 performs arithmetic operations to determine the magnitude of electric current to be supplied to the motor M which drives each axis, thereby controlling the supply current.

With this structure, the working robot 2 is moved by executing a sequence program according to a command from the T-BOX 1.

Figure 2:
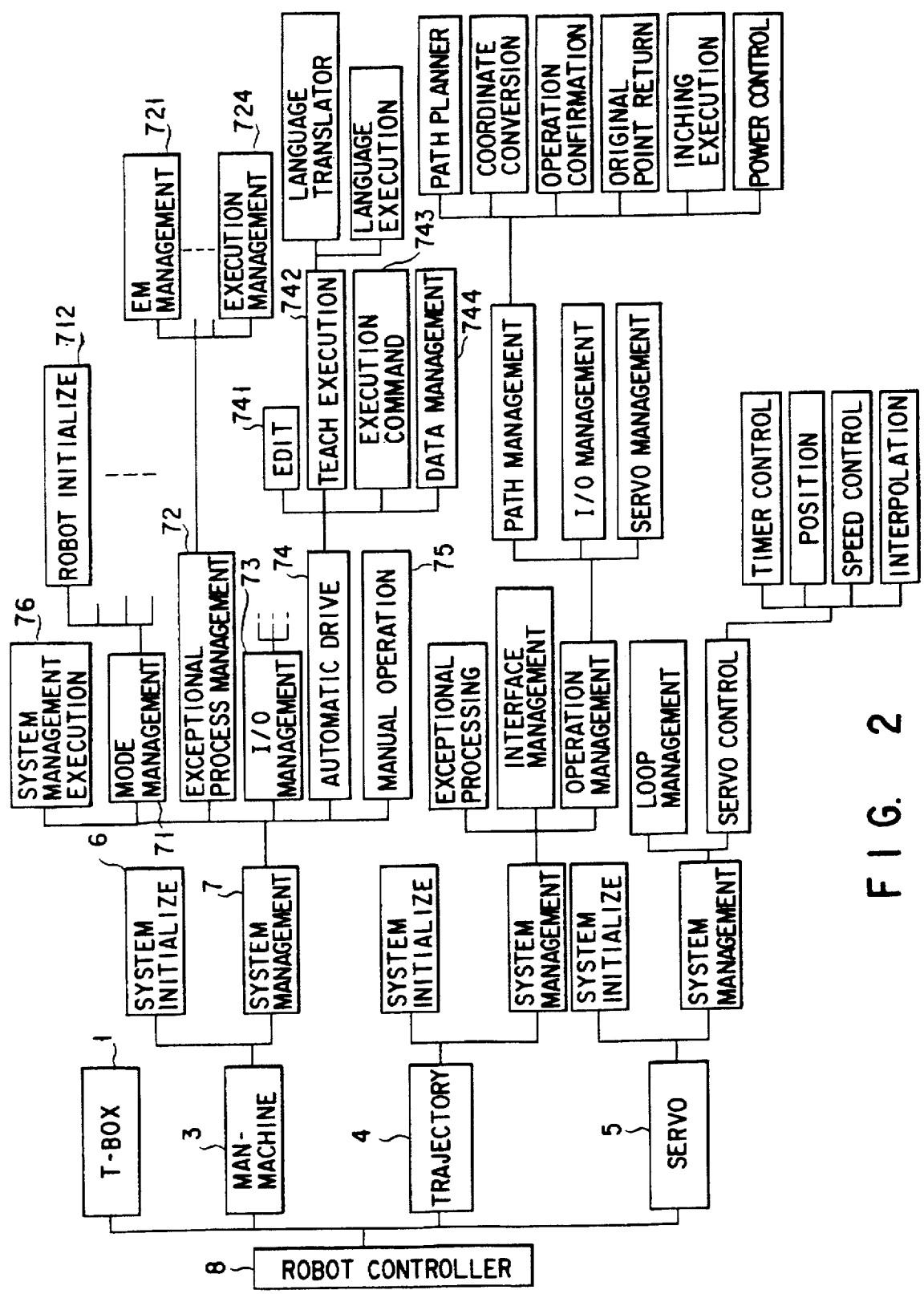
FIG. 2 shows a system structure of hierarchical software.
Figure 3:
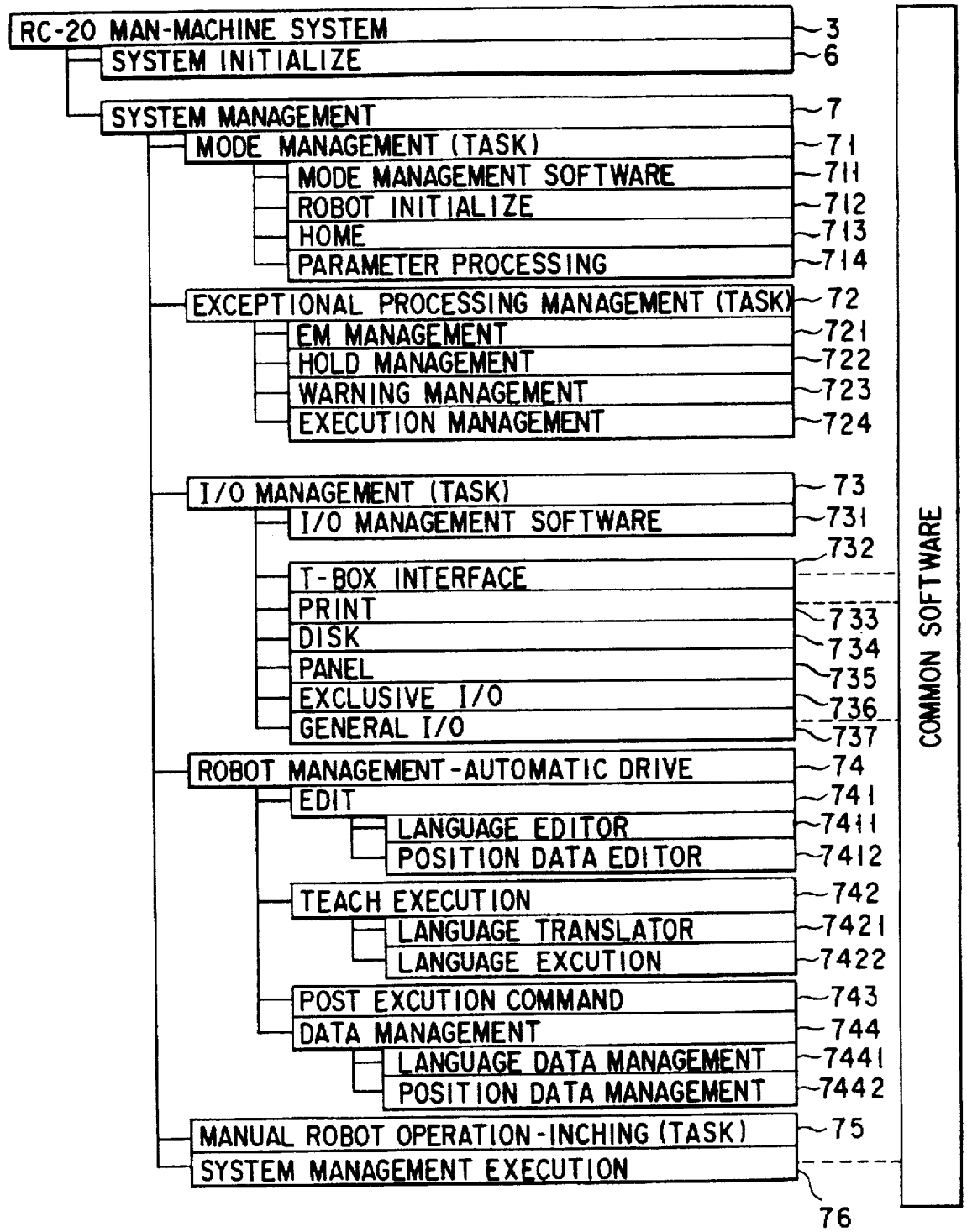
FIG. 3 is a detailed view of a man-machine system of hierarchical software.

This computer system is executed by hierarchical software, as shown in FIG. 2. FIG. 3 shows in detail the hierarchical software of the man-machine sub-system 3, as shown in FIG. 2.

In FIGS. 2 and 3, system initialize 6 is a software for clearing a RAM, initializing peripheral ICs, etc. The system initialize 6 communicates with other sub-systems and checks whether all sub-systems are operating normally.

System management 7 manages the entire man-machine sub-system 3. Specifically, the system management 7 manages tasks and clears various global variables. The system management 7 is divided into six: mode management (task) 71, exceptional process management (task) 72, I/O management (task) 73, robot management (automatic operation) 74, manual robot operation-inching (task) 75 and system management execution 76.

The mode management 71 is divided into four: mode management software 711, robot initialize 712, HOME 713 and parameter processing 714.

The mode management software 711 is a software for managing the entire man-machine sub-system 3 and for reading the data and managing and executing each mode in accordance with an operator's operation.

The robot initialize 712 transmits an original point return command to the trajectory sub-system 4 and waits for an end command.

The HOME 713 transmits a home position command to the trajectory sub-system & and waits for an end command.

The parameter processing 714 sets and manages parameters within the man-machine sub-system 3. The parameters include:

offsets (for eight axes) of robot coordinates;

an offset from an absolute coordinate system to a mechanical coordinate system;

an offset to TCP; setting of conditions for serial communication;

a speed table (eight steps PTP: % indication CP: mm/s indication);

setting of an operational range (for eight axes);

presence/absence of a balance function;

presence/absence of an external start;

presence/absence of a machine lock;

setting of a device number;

assignment of general output to a function key; and others.

The exceptional process management 72 is divided into four: EM management 721, HOLD management 722, WARNING management 723 and execution management 724.

The EM management 721 performs a process at the time of an emergency halt and more specifically performs an interrupt process and a process for emergency halt of the robot 2 after the completion of the interrupt process.

The HOLD management 722 monitors a HOLD signal and tells it to the entire system. In this example, only the operation of a HOLD flag is executed.

The WARNING management 723 is a software for monitoring and displaying a warning issued from each process or a sub-system.

The execution management 724 manages, records (in the memory 37) and counts the execution state of each module, and displays on the display 11 of T-BOX 1 the name of an interrupted module on the basis of information from the WARNING management 723 at the time of the EM process and HOLD process.

The I/O management 73 is divided into seven: I/O management software 731, T-BOX interface 732, print 733, disk 734, panel 735, exclusive I/O 736 and general I/O 737.

The I/O management software 731 manages the I/O of the controller 8.

The T-BOX interface 732 communicates with the T-BOX 1 and starts communication when a display request or a key input request is issued.

The print 733 transmits print data to a printer (not shown), and includes:

printing of a teach program/teach data;

printing by execution of a teach program; and printing of parameters.

The disk 734 performs data transactions with a floppy disk (not shown) and it performs input/output of teach data/teach program/parameters.

The panel 735 performs output to a lamp of a panel of T-BOX 1, output to a buzzer, and input to a panel key.

The exclusive I/O 736 performs input/output of exclusive I/O.

The general I/O 737 performs input/output of general I/O.

The robot management 74 is divided into four: edit 741, teach execution 742, post execution command 743 and data management 744.

The edit 741 is divided into language editor 7411 and position data editor 7412.

The language editor 7411 performs preparation and edit of robot language. When one line has been input, data is delivered to grammar check of surface language. If there is no problem, the data is delivered to the intermediate language translator 33. The surface language and the translated intermediate language are delivered to the data management 744 and stored in the memory 37.

The position data editor 7412 newly prepares and edits position data.

The teach execution 742 is divided into language translator 7421 and language execution 7422.

The language translator 742 performs:

1) grammar check of surface language, 2) translation of surface language to intermediate language, and 3) translation of intermediate language to surface language.

The language execution 7422 reads in and executes intermediate language.

The post execution command 743 executes a robot operation from a designated block number and a step number.

The data management 744 is divided into language data management 7441 and position data management 7442.

The language data management 7441 manages intermediate language, reads intermediate language and writes intermediate language.

The position data management 7442 manages position data, reads position data and writes position data.

The manual robot operation-inching 75 is activated as task from the system management 7 and is always set in an active state. The manual robot operation-inching 75 constantly monitors the operator's operation information and tells an inching operation to the trajectory sub-system 4 on an as-needed basis. In addition, the manual robot operation-inching 75 transfers data of inching mode management, key information management, etc. to the trajectory sub-system 4.

The system management execution 76 is a software for managing an execution section for executing a system program.

The operation of the computer system will now be described.

When the entire man-machine sub-system 3 is started, the T-BOX 1 is first turned on to effect mechanical initializing. Then, the mode menu (current mode) is displayed on the display 11 of the T-BOX 1. At first, an initialize mode appears. When the system initialize is instructed, the system is successively started and set in a ready state.

Subsequently, the teach mode enters. In the teach mode, a sequence program can be assembled. In this state, position information for operating the working robot 2 is successively stored in the SRAM (memory 37) of the man-machine sub-system 3 by the push button operation of the T-BOX 1, with the position data of each axis of the working robot being employed as world coordinates of the tip portion of the working robot 2.

Now refer to, for example, spot welding. The position data of each axis of the working robot 2, e.g. 10 position data items, is converted to world coordinates and stored. All data is stored in the memory 37 within the man-machine sub-system 3. Thereafter, if the automatic drive mode is set, the working robot 2 can be operated according to input data in an entirely automatic manner.

When the working robot 2 is automatically driven, the teach execution 742 of the automatic drive software reads in and interprets the sequence program under the system management 7 of the man-machine sub-system 3. If the execution command is given to the trajectory sub-system 4, the trajectory sub-system 4 finds the operation amount of each axis of the working robot 2 from the world coordinates by means of the coordinate converter 42. The operation amount is given to the servo sub-system 5 from the servo management device 44, and the working robot 2 is controlled by the servo control software. When these software modules are executed, the fact that the software modules are being executed is stored in the memory 37 and RAMs 45 and 51 by means of the numbers of modules. The man-machine sub-system 3 has functions of storing this fact in the memory 37 and freezing the stored content simultaneously with occurrence of abnormality. Thus, the T-BOX 1 can be made to display which software is being executed, at the time of, e.g. occurrence of abnormality on an as-needed basis.

As has been described above, the software of the computer system operated by software is classified hierarchically, and a module of the hierarchical software, which is being executed for a predetermined time period, is managed as a minimum unit. The module is displayed on an as-needed basis and the execution state of software is understood. Thus, the execution state of the computer system can be displayed in units of a module which is executed for a predetermined time period, thereby facilitating diagnosis and countermeasure by the maker.

Furthermore, the software of the computer system operated by software is classified hierarchically, and a module of the hierarchical software, which is being executed for a predetermined time period, is stored as a minimum unit by rewriting the executed module each time execution is effected. The stored content is frozen simultaneously with occurrence of abnormality, and it can be checked at an early stage which module being executed is malfunctioning. Thus, the state of the computer system can be displayed in units of a module which is being executed for a predetermined time period, thereby facilitating diagnosis and countermeasure by the maker.

I claim:

1. A computer system operable by hierarchical software for controlling an industrial robot connected to said computer system, said industrial robot comprising a plurality of subsystems, the computer system comprising:

input means for inputting instruction data containing an order in which software modules of said hierarchical software should be executed, one of said modules which is being executed for a predetermined time period being treated as a minimum unit by said computer system;

execution means for executing said software on the basis of said instruction data;

monitor means for monitoring and detecting an abnormality in each individual part of the computer system and in said industrial robot subsystems;

management means for managing one of said software modules which is being executed by said execution means and for displaying on a display the one of said software modules which is currently being executed by said execution means when an abnormality is detected by said monitor means;

wherein said management means includes a memory and stores data in the memory in a manner such that the informational content of the currently executed software module is written into the memory each time a software module is executed by said execution means, and when an abnormality is detected by said monitor means, the stored content of said memory is frozen, and the frozen content of said memory is displayed on said display; and wherein said management means writes into said memory the informational content of a software module which was executed by said execution means immediately preceding the currently executed software module, and when the abnormality is detected by the monitor means, freezes and displays the informational content of the preceding software module.

2. A computer system according to claim 1 wherein said execution means includes a plurality of sub-execution means, and said management means includes means for storing information indicating the software module currently being executed by each of said sub-execution means.

3. An industrial robot computer system operating on software classified hierarchically wherein a module of the hierarchial software being executed for a predetermined time period is managed by said computer system as a minimum unit, comprising, a man-machine subsystem for receiving input commands and outputting position information, a trajectory subsystem for receiving position information and outputting coordinate signal commands, and a servo subsystem for receiving coordinate signal commands and outputting drive signals for operating a robot, each said subsystem executing modules in the hierarchial software for operating the robot, said man-machine subsection including a memory for storing information identifying the module and the software of the module that is being executed, a control section including a display for displaying the information identifying the module and the software of the module that is being executed, means responsive to the detection of an abnormality in the operation of the computer system or any said subsystem for indicating on the display the information identifying the module of software that is being executed and for freezing in the man-machine subsystem memory the software of the module of software being executed, means for causing the software of the module stored in said memory to be displayed on said display for facilitating error diagnosis, and wherein said display also displays information identifying the module that immediately preceded the module currently being executed, and said memory also stores the software of the module that preceded the module currently being executed, wherein upon the detection of an abnormality in the operation of the computer system or any said subsystem the preceding module is frozen in memory and also displayed on the display for facilitating error diagnosis.

* * * * *